United States Patent Office 3,452,742
Patented July 1, 1969

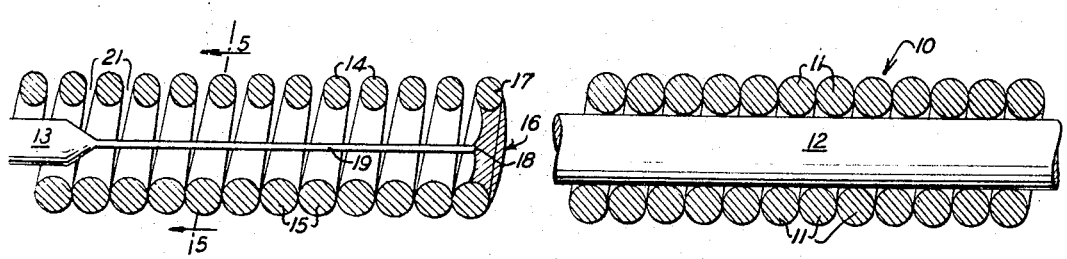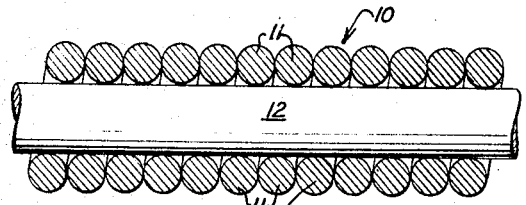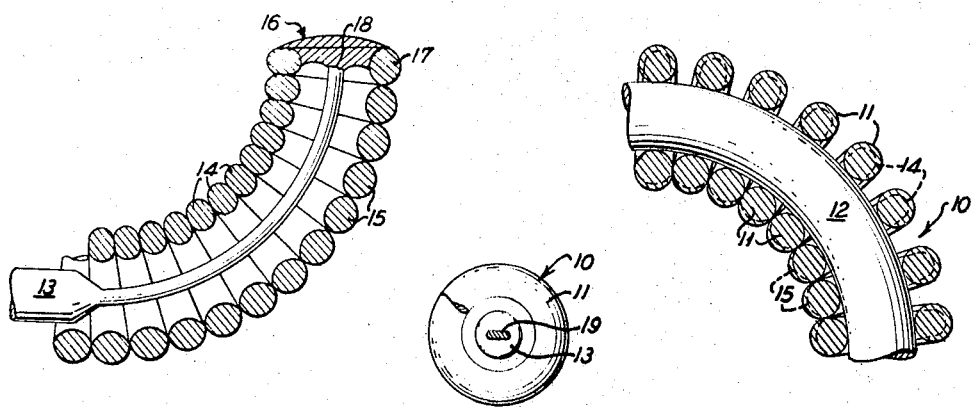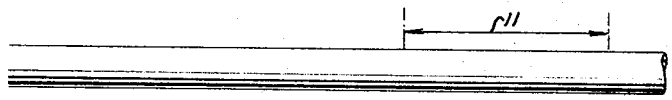
INVENTOR
WOLF F MULLER

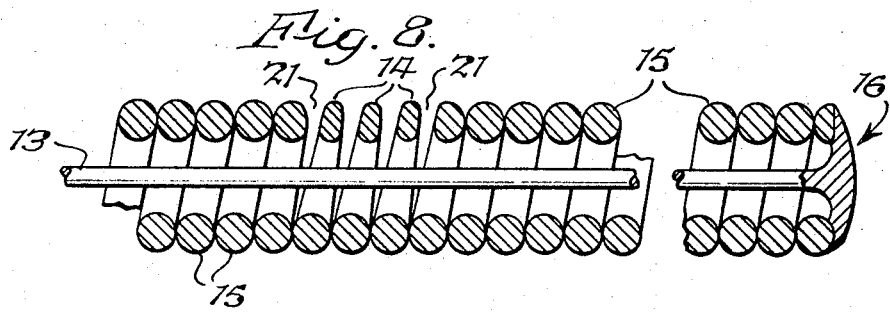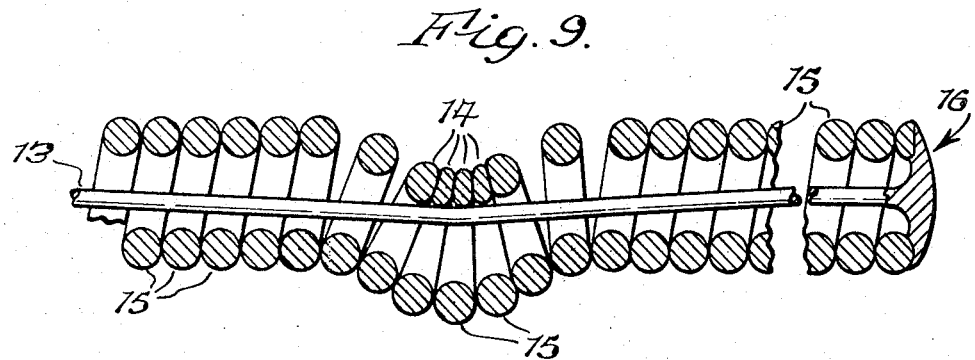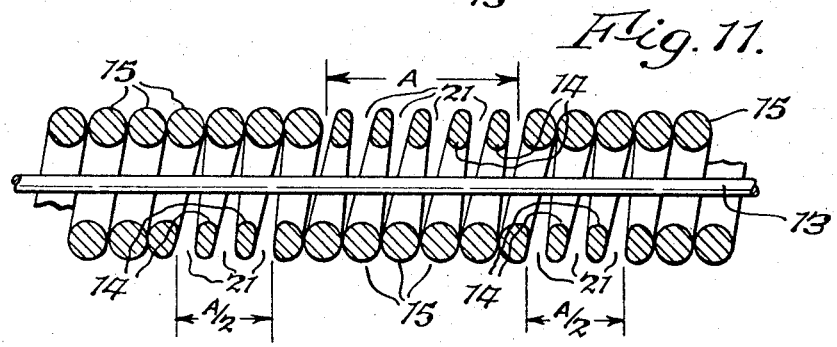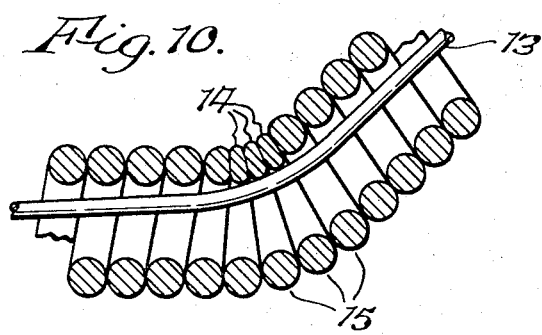

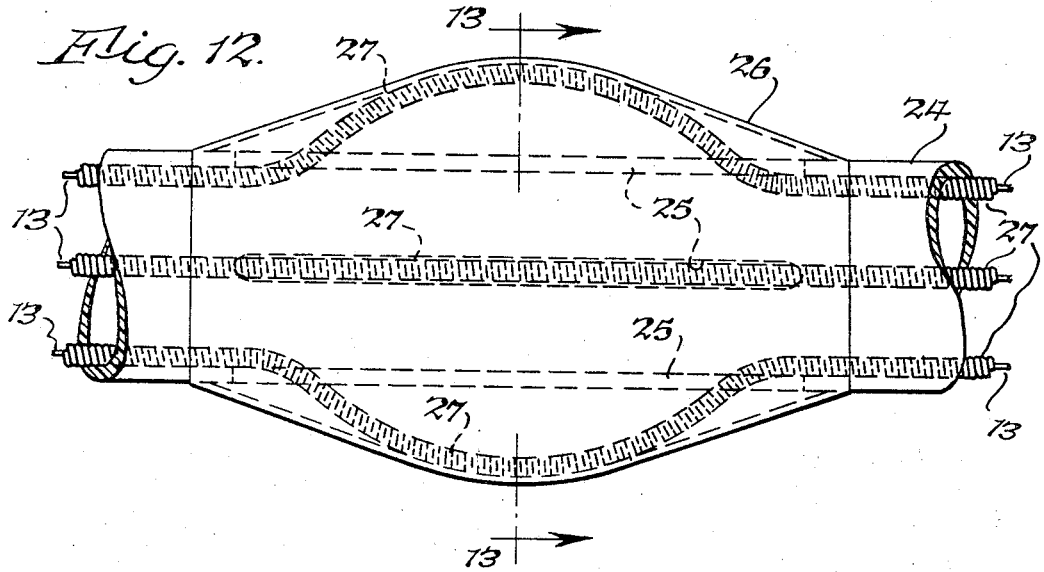
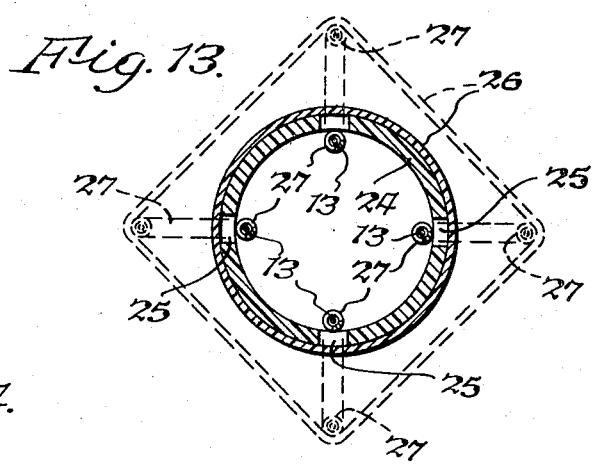
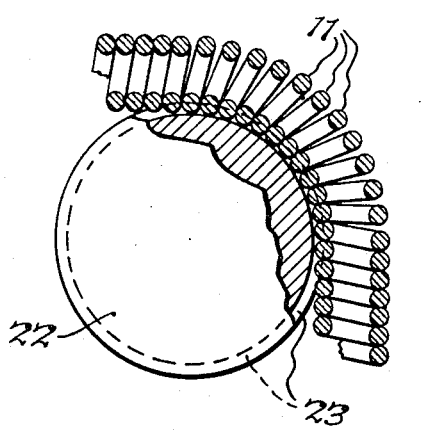

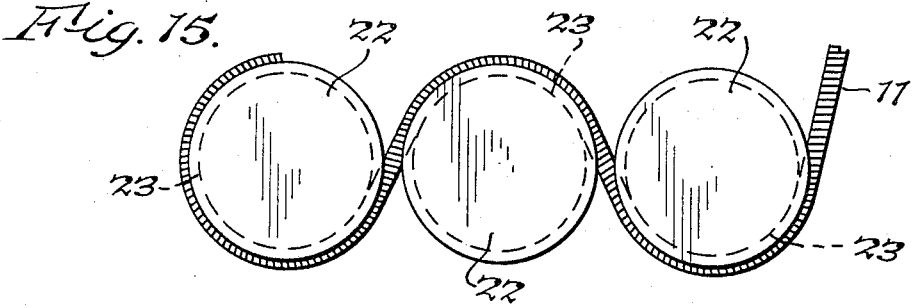
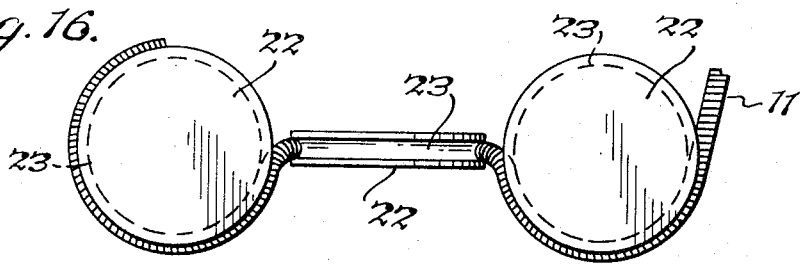
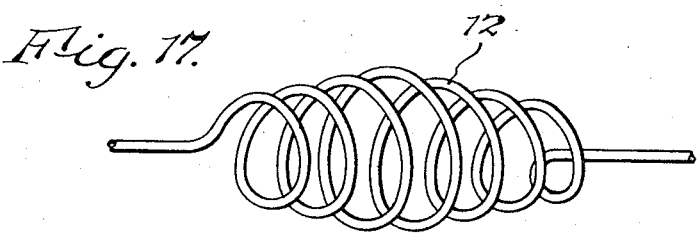
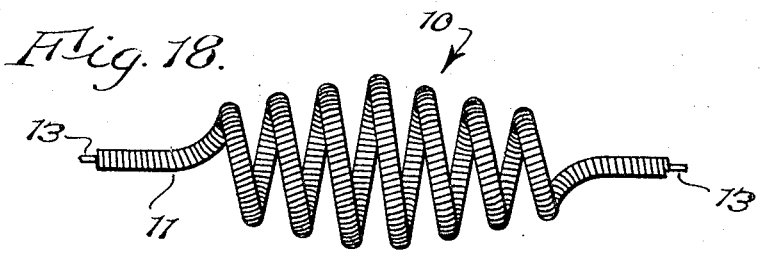

3,452,742
CONTROLLED VASCULAR CURVABLE SPRING GUIDE
Wolf F. Muller, New York, N.Y., assignor to United States Catheter & Instrument Corporation, Glens Falls, N.Y., a corporation of Delaware
Continuation-in-part of application Ser. No. 512,143, Dec. 7, 1965. This application June 29, 1966, Ser. No. 563,927
Int. Cl. A61b 5/10
U.S. Cl. 128—2
17 Claims

ABSTRACT OF THE DISCLOSURE

This invention concerns an elongated coiled-spring guide generally used in internal vascular manipulation, e.g. guiding a vascular catheter and particularly relates to segments of the spring guide, more commonly the tip, that are curvable in a particular direction because adjacent coils are spaced from each other in the particular segment on one side only.

---

This application is a continuation-in-part of my copending application Ser. No. 512,143, filed Dec. 7, 1965, now abandoned, for a controlled curvable spring guide tip and its method of manufacture.

This invention relates generally to new and useful improvements in spring guides used primarily in internal vascular manipulations and particularly seeks to provide a novel spring guide so constructed that its tip and/or predetermined portions of its length may be controllably curved by manipulation from its proximal end.

The marked advances in cardiac and vascular surgery in the past few years and other medical problems that require diagnostic study of the vascular beds and systems has led to the extensive use of cardiac or vascular catheters, particularly for retrograde aortography and angiocardiography, and less often to take blood samples, determine oxygen content, infuse medicaments, etc. at internal sites and various other uses that require the insertion of a relatively long catheter to an internal site that requires movement of the catheter into branch vessels at sharp angles relative to the feeding direction of the catheter.

The most common method for insertion of such catheters is the percutaneous technique described in 1953 by Sven Ivar Seldinger. In this procedure a local anesthesia is administered and a skin puncture made at a small angle to the vessel (e.g. femoral in the leg or brachial in the arm) with an obturator positioned within a cannula. Once the unit has been properly located in the vessel, the obturator is removed and the flexible spring guide then inserted through the cannula into the vessel for a short distance. Pressure is then applied to hold the spring guide in place while the cannula is withdrawn. The spring guide is then fed into the vessel generally under the fluoroscope until the desired point is reached which may or may not require considerable manipulation if there are branched vessels or curves concerned. There after the catheter is passed over the flexible spring guide and fed into the desired position and the spring guide then withdrawn from the catheter unless both are needed for cooperative manipulation purposes.

There is presently available spring guides made from stainless steel from about 110 to 260 cm. lengths, each having outside diameter sizes from about 0.025" (pediatric), to 0.052" which are used with correspondingly shorter catheters. The guides consist of an outer case which is a closely wound stainless steel spring to form a continuous coil surrounding an inner bore which is then sealed at the distal end with a rounded tip or cap. A straight inner wire is placed within the coil bore and is either freely movable within the guide or fixed within the guide about 3 cm. short of the distal tip which is left flexible for manipulation purposes.

The spring guides are quite flexible but there is little or no lateral control over the distal end from the proximal end after insertion into a vessel. Thus to pass sharp curves or to go into branch vessels the surgeon must make all kinds of turning and push-pull manipulations, with the hope that by chance the distal end will finally lead into the branch vessel or around the curve as desired. Others have attempted to use spring guides with curved tips. Even after the spring guide, curved tip or straight, gets hooked into a branch vessel, the tendency of a straight catheter being guided thereover is to continue straight past the branch, causing a loop in the guide, which the catheter may not follow or which may cause trauma if too much force is applied.

Some catheters have soft curved ends which are maintained in a straight position as the catheter is fed through the vessel over the spring guide. When the catheter is pushed beyond the spring guide, then the catheter tip recovers its normal curved form and can be used to enter branch vessels, etc. This, however, has not been entirely satisfactory and presents several problems, one of which is that the surgeon must be manipulating both the spring guide and the catheter to secure results. Secondly, once the spring guide is removed from the catheter tip the tip has a set curve which cannot be changed nor straightened without insertion of the guide, and perhaps most importantly, the curve is in one direction only so that rotation of elongated catheters from the proximal end is necessary.

Furthermore, none of the prior known forms of spring guides could be laterally displaced at one or more positions intermediate the ends thereof to define curved offsets or arches to frictionally anchor or retain an enclosing catheter in a vessel during extended time infusion of medicines or therapeutic chemicals.

I have found that a spring guide may be constructed to provide terminal coils, and/or coils at predetermined positions along its length, the wire of each of which has a greater cross-sectional diameter (parallel to the longitudinal axis of the spring guide) on one side of the spring guide than the other (with gradual change between), with the coils remaining in the conventional spiral arrangement by providing space between those adjacent coil arcs having the lesser diameter. Thus if the coiled wire were straightened, the length portions between the portions having different cross-sectional diameters would have a constant diameter while the remaining portions would have a periodic increase and decrease in diameter, the period being equal to the length of a single coil. With this construction, if a force is applied along the length of the spring guide from the distal end toward the proximal end, the spring guide will curve in those areas containing coil arcs of reduced cross-section until the spaces therebetween become closed and rigid curves are formed.

Therefore, an object of this invention is to provide a spring guide so constructed that its normally straight distal end and/or one or more portions of its length may be manipulated from the proximal end that is outside the patient.

Another object of this invention is to provide a spring guide of the character stated in which its distal end and/ or one or more portions of its length may be curved or straightened from the proximal end as desired.

Another object of this invention is to provide a spring guide of the character stated in which its manipulatable curved tip and/or curved length portions are sufficiently rigid to effect faithful curving of a following catheter.

A further object of this invention is to provide a spring guide of the character stated in which the coils of the curvable portions thereof, when straight, are spaced from each other on one side and contiguous on the other.

A further object of this invention is to provide a spring guide of the character stated in which portions thereof may be curved after a catheter is placed thereover and thus cause the catheter to curve.

A further object of this invention is to provide a spring guide of the character stated which can be used to mechanically distend a latex sheath surrounding a portion of the length of a catheter to simulate a balloon catheter.

A further object of this invention is to provide a spring guide of the character stated that can be retained within a catheter during extended-time liquid infusions and can be laterally displaced along a portion of its length to effect a corresponding displacement of the catheter to firmly anchor or retain it within a vessel.

With these and other objects, the nature of which will be apparent, the invention will be more fully understood by reference to the drawings, the accompanying detailed description and the appended claims.

In the drawings:

FIG. 1 is a longitudinal section taken through a spring guide constructed in accordance with this invention with the tip in straight position;

FIG. 2 is a longitudinal section of the tip of FIG. 1 in a curved condition;

FIG. 3 is a longitudinal section taken through a conventional spring guide tip with a forming wire in position prior to forming the tip of FIG. 1;

FIG. 4 is a longitudinal section through the spring guide of FIG. 3 after it has been curved to the position for treatment;

FIG. 5 is a transverse section taken along line 5—5 of FIG. 1;

FIG. 6 is a profile view of the wire when straightened from FIGS. 1 and 2;

FIG. 7 is a profile view of the conventional wire when straightened from FIGS. 3 and 4 or from the proximal segments (not shown) of FIGS. 1 and 2;

FIG. 8 is a view similar to FIG. 1 but shows the reduced diameter wire arcs at a location intermediate the ends of the spring guide;

FIG. 9 is a view of the spring guide portion of FIG. 8 and shows the spring guide curved as it would appear when positioned within and restrained by a vessel;

FIG. 10 is a view similar to FIG. 9 but shows how the curvature would appear if in the open air and unrestrained;

FIG. 11 is a view similar to FIG. 8 but shows three successive sets of tapered coils to cause natural formation of the lateral arch of FIG. 9 without having to rely on the restraining effect of a vessel;

FIG. 12 is an enlarged top plan view of the end portion of a balloon-like catheter as mechanically distended by a plurality of spring guides;

FIG. 13 is a transverse section thereof taken along line 13—13 of FIG. 12 and shows the undistended portion in full line section while its distended condition is indicated in dotted lines;

FIG. 14 is a fragmentary view, partly in section, showing the use of a peripherally grooved forming wheel anode for spreading the coils of a spring guide to permit chemical treatment;

FIG. 15 is a schematic view showing how a plurality of the forming wheel anodes of FIG. 14 may be used to prepare a spring guide having a series of reverse curvable portions in a single plane;

FIG. 16 is a view similar to FIG. 15 but shows the forming wheel anodes arranged to provide for a curvable portion of the spring guide in a different plane from the plane of the other curvable portions;

FIG. 17 is a perspective view of a spring guide forming wire shaped as a compound helix to produce a normally straight spring guide having a continuously varying curvable portion; and FIG. 18 is a plan view of the curved portion of a spring guide, under tension, after having been formed through use of the helix of FIG. 17.

Referring to the drawings in detail, one form of the invention as illustrated is embodied in a spring guide having a curvable tip controlled by an inner wire from the proximal end.

A conventional spring guide tip is shown in FIG. 3 made up of continuous coils 11 which are uniform in diameter completely about their arcuate circle as shown particularly at the top and bottom of FIG. 3 or as shown in FIG. 7 if the coiled wire were straightened. Extending through the spring guide in FIG. 3 is a forming wire 12. When the forming wire 12 is curved by external force, the individual coils 11 of the spring guide take the positions shown in FIG. 4, i.e. those on the inner radius all touch one another, whereas those on the outer radius are now spaced from each other. If the coil is fixed in the position shown in FIG. 4 and placed into a chemical solution that will dissolve the wire coils, the outer radius coil arcs will be dissolved on three sides thereof, whereas the inner radius coil arcs will be dissolved only on one side because of the spacing, on the one hand, between the outer radius arcs, and the lack of spacing between the inner radius arcs. The resultant spaces 21 between coils will be wedge-shaped as shown in FIG. 1 and the shape of the wire in straight line will be periodically thick and thin as shown in FIG. 6 with the period representing the length of a complete coil with the apex or thickest points at 15 and the thinnest points at 14. The amount of dissolving and thus spacing can obviously be controlled by the time factor or strength of solvent.

This dissolving may be accomplished in various ways. It can be a straight dissolving solution for stainless steel, such as aqua regia, with or without HF, HCl, $H_2SO_4$, et al., it may be an etching solution for stainless steel or preferably, it may be an electrolytic polishing for stainless steel which is a well known process wherein the workpiece is immersed as the anode in an electrolytic bath that can form a soluble salt with the metal. A bath of phosphoric or sulfuric acid is used, to which may be added such acids as benzoic, tartaric, citric or chromic acid, alcohol, glycerol, benzene, commercial inhibitors and the like, which solutions have low electrical resistance and operate on low voltages usually not higher than 25 volts, the operating temperatures being from 100–300° F., depending on the solution. The electrolytic polishing has the obvious advantage that the end product is smooth.

After the guide has been treated on the wire in the shape as shown in FIG. 4 and the inner forming wire 12 removed the spring guide then takes the position shown in FIG. 1 where the arcuate sections of coils on one side at apex 15 retain most of their previous diameter which is shown at the bottom of FIG. 1, but the coils on the opposed side 14 shown at the top of FIG. 1 have a greatly decreased diameter on at least three sides.

If core wire 13 is now secured near or at the distal tip of the spring guide and force applied toward the proximal end, the distal tip will take the position shown in FIG. 2 because of the decreased diameter of the arcuate portions 14 relative to the increased diameter of the arcuate portions 15.

For commercial purposes it will be desirable to cover the distal end of the spring guide with a cap 16 as shown in FIGS. 1 and 2. The core wire tip 19 may be permanently secured to the distal tip at point 18, or it may have a hook or enlarged head thereon (or on the spring guide) which permits temporary attachment to the distal tip and removal therefrom as desired. As shown, the cap 16, distal end of tip 19 and distal coil 17 are welded into an integral unit for safety reasons.

The core wires are generally 0.012" or 0.014" which normally adds considerable stiffness to the guide, whereas it is desirable to have flexibility in the distal tip but the core wire must continue fully to the distal end to create the curve. Formerly, the core wire was reduced in diameter at the tip to insure flexibility but at a loss of strength. I have found that if the core wire is flattened in the tip as at 19 to about 0.004" x 0.020", both flexibility in one plane is gained and strength retained. Since the guide will only curve in one direction, the thin flat plane of the core wire is oriented to be parallel with the reduced arcs of the tip.

Obviously a handle may be provided where the core wire 13 extends out from the proximal end (not shown) of the guide for applying force to curve the tip, or other manual means may be used as desired.

It will also be obvious that the various methods disclosed herein for reducing the diameter of the arcuate portions 14 are only exemplary of many other possible ways. Other chemical and/or mechanical methods can be used, e.g. a wedge-shaped grinding wheel between coils from one side or forming of wire as in FIG. 6 before coil formation. Furthermore, the same effect may be obtained, i.e. having a lesser diameter on one side than on the other by increasing the diameter of the outer radius side shown in FIG. 4 while leaving the inner radius side at its prior diameter. Such a process could be done by coating or by electroplating, for example.

Stainless steel has conventionally been the choice for spring guide coils and the wires that are placed through the bores thereof, which choice is respected as preference here. However, materials could be German silver, nickel, Monel, gold or other metals or alloys, and of course, the chemical formulas for plating, polishing or dissolving solutions would have to be changed in accordance with the particular metal or alloy from which the spring guide had been made.

It will be obvious, of course, that there are various ways of utilizing this item in practice. The spring guide per se may be manipulated to lead the distal end into branch arteries or around curves in the various vessels. In addition, the spring guide may be put in straight and then covered by the catheter and then the tip curved with the catheter thereon, which will of course, also curve the catherer, so that the manipulation is done with the combined spring guide and catherer. If it is desired to pass two curves or branches with one operation, the spring guide alone can, of course, be passed around a first branch or curve by manipulation as described, then fed beyond this curve and the tip straightened, as the curve will now be held by the blood vessel itself and the tip will then be ready for further manipulation through the control wires to move into a second branch. Once again, this may be done with the spring guide alone or in conjunction with the catheter covering same.

One of the problems heretofore has been the flexibility of the tip when feeding the catheter over or beyond the tip. On many occasions, the catheter straightens the tip or creates a short radius loop immediately ahead of the catheter tip which then serves to defeat the directing of the catheter into a side vessel. However, because of the instant construction, the rigidity of the spring guide tip may be controlled by the amount of proximal force applied to the core wire. Furthermore, sufficient force may be applied to make the spring guide tip very rigid so that the catheter tip will faithfully follow the guide without straightening same or forming a loop.

Thus it is easy with this device to pass into a 90° branch by curving the spring guide with the catheter tip surrounding same or later fed thereover, and then subsequently paying out the catheter considerably beyond the guide and branch point whereby the catheter curve is now held by the vessel itself. Then the spring guide tip force may be released and the spring guide fed out beyond the extended catheter, as the tip is again straight, until a second curve or branch is reached, at which time the tip is curved for leading or guiding the catheter into a second branch.

As an example, a 0.045" O.D. stainless steel spring guide formed from 0.013" spring wire with an I.D. of 0.019" is first stressed relieved at the tip by passing through a flame to a dull red heat or heating in a furnace to accomplish the same result. Thereafter it is placed over a 0.018" stainless steel forming wire and bent into a curvature such as shown in FIG. 4. It is then immersed as the anode in an electrolytic polishing bath composed of 15% sulfuric acid, 63% phosphoric acid and the remainder water with a current being applied of at least 50 amperes/sq. ft. of surface, which in this case amounts to approximately 4 volts for from 6 to 8 minutes, with the solution at a temperature at 130° F. It is thereafter removed from the bath, washed and the forming wire removed whereupon the tip reverts to its straight shape at a reduced O.D. of about 0.040". This means that about 0.002" has been removed from the exterior surfaces of arcs 14 and 15 as shown in FIG. 1 and about 0.002" from each side of the exterior surfaces of arcs 14, to leave a spacing of about 0.004" between each succeeding arc 14 as shown at the top of FIG. 1.

The principles of this invention may also be applied to provide spring guides with one or more curvable portions intermediate the ends thereof so that the spring guides can serve as vastly improved tools or instruments when it is necessary to perform such functions as retaining or anchoring a catheter in place during extended-time infusion of liquids at a very low volumetric delivery rate, or expanding or distending the latex-sheathed portion of a balloon-like catheter when inserted in a vessel.

Thus FIGS. 8–10 of the drawings show an intermediate positioning of the coil sections 14 and 15 and the intervening wedge-shaped spaces 21 to define a curvable portion located proximal to the distal tip.

If tension is applied to the core wire 13 when the spring guide is in the open position it will be curved as shown in FIG. 10 so that its distal end portion will be at an angle to its proximal end. However, when the spring guide is inserted into a vessel and tension is then applied to the core wire 13, the proximal and distal ends will be restrained against angular movement by the walls of the vessel and the curved portion will take the shape of a laterally offset arch, as will the corresponding portion of a surrounding catheter. In this manner frictional engagement between the catheter and the walls of the vessel can be increased and the catheter can be firmly retained in position.

The lateral arch of FIG. 9 can also be formed naturally, without having to rely on the restraining effect of a vessel, by forming the curvable portion of the spring guide in such a manner that it will be reverse curved when tension is applied to the core wire 13. This type of curvature can be effected by forming the coil sections 14 and 15 and the intervening wedge-shaped spaces 21 as shown in FIG. 11 of the drawings. In this form there is a first curvable portion in which the coil sections 14 are at one side, followed by a second curvable portion in which the coil sections 14 are at the opposite side and which forms the main part of the lateral arch, and followed by a third curvable portion in which the coil sections 14 are again at the bottom.

Assuming that it is desirable to continue the normal alignment of the proximal and distal portions of the spring guide beyond the extremities of this compound curvable portion, then the second curvable portion thereof should have a length A sufficient to subtend the desired angle of the lateral arch, say 60°, and the first and third curvable portions thereof each would have a length of one-half A.

Either compound or simple curvable portions may be produced through the use of forming wires as shown in FIG. 4 of the drawings, or may be produced through the use of forming wheels of the type shown in FIG. 14 of the drawings in which a titanium or tantalum wheel or disk 22, provided with an arcuate peripheral groove 23, is used to establish and maintain the desired curvatures of the spring guide coil during metal-removing treatment.

FIG. 15 of the drawings schematically indicates how three such forming disks 22 could be used to form one type of compound curvable portion in which all curves would lie in a single plane, while FIG. 16 schematically indicates how such forming disks could be used to form another type of compound curvable portion in which one or more curve would lie in a plane or planes differing from the plane or planes of the remaining curves.

By properly configuring the forming wires 12 or the forming disks 22, an almost endless variety of compound curves can be effected for numerous end uses and for numerous types of tools or instruments.

For example, in FIG. 17 of the drawings the forming wire 12 has been bent into the form of a compound helix having helices of constantly increasing, then constantly decreasing radii and/or pitch. If a portion, say the distal end, of a spring guide is fitted over the coils of this helix and then exposed to the metal removal treatment, the resultant curvable distal end portion would assume the general shape of an irregular corkscrew when tension is applied to the core wire 13 as schematically illustrated in FIG. 18 of the drawings.

In some instances where the curvilinear distortions of the spring guide are quite complex in preparation for the metal removing treatment, it may be preferable to replace the compound helix, or other forming wire structure exemplified by FIG. 17, by a solid metal form having a continuous external worm-like groove corresponding in function to the groove 23 of the disk 22.

In these types of construction the wedge-shaped spaces 21 are progressively angularly offset about the longitudinal axes of the spring guides.

As mentioned above, spring guides constructed in accordance with this invention can be incorporated in balloon-like catheters to mechanically distend a portion thereof. For that purpose (see FIGS. 12 and 13) a relatively large diameter catheter 24 is provided with a plurality (four in the present illustration) of longitudinal slots 25 symmetrically arranged around the periphery thereof and covered by an inflatable latex sleeve 26 having its ends sealed around the catheter. Four spring guides 27 are carried within the catheter 24 and contain curvable portions disposed in radial alignment with the slots 25. Conveniently, the curvable portions of the spring guides may be formed in accordance with FIG. 11 so that pronounced lateral (radial with respect to the catheter) arches may be formed when tension is applied to their core wires as clearly shown in FIG. 12. When tension on the core wires is released the arches withdraw into the catheter and the latex sleeve 26 resumes its normal undistended condition as shown in FIG. 13.

The mechanical distension of the sleeve 26 eliminates the need to use either air or liquid under pressure to inflate same and thus avoids the danger of bursting under pressure with the consequent uncontrolled surge release of the air or liquid into the surrounding vessel. Also the exact amount of distension may be accurately controlled by tensioning the core wires of the spring guide.

This same principle of catheter construction, with or without the sleeve 26, can be used for smaller diameter catheters for insertion into vessels too small to accept a balloon distension without rupture, but capable of withstanding some distension.

It is, of course, to be understood that variations in arrangements and proportions of parts may be made within the scope of the appended claims.

I claim:
1. A vascular spring guide formed from a continuously coiled wire to provide a plurality of adjacent spiral coils about a continuous bore including, when straight, at least one curvable portion wherein adjacent helices are contiguous to each other along one side of the coil and spaced from each other along the opposed side thereof.

2. The spring guide of claim 1 in which the spaces between the helices of said curvable portion are wedge-shaped extending from a sharp point at said one side to the greatest width at said opposed side.

3. The spring guide of claim 2 which includes a core wire passing through said bore and secured to said spring guide adjacent the distal end thereof.

4. The spring guide of claim 3 in which a said curvable portion is located at the distal end thereof.

5. The spring guide of claim 3 in which the coils are fully contiguous to each other throughout the length thereof other than said curvable portion.

6. The spring guide of claim 3 which includes a proximal portion wherein adjacent coils are fully contiguous to each other.

7. The spring guide of claim 3 in which said core wire is flattened within said distal curvable portion in a plane transverse to said coil sides.

8. The spring guide of claim 5 in which the coil wire of any curvable portion has a greater cross-section on said one side than on said opposed side and the coil wire of all other portions has a constant cross-section.

9. The spring guide of claim 3 in which the coil wire of said curvable portion has a greater cross-section on said one side than on said opposed side and the coil wire of all other portions has a constant cross-section.

10. The spring guide of claim 3 in which the coil wire of any non-curvable portion thereof has a constant cross-section and of any curvable portion thereof has a cross-section varying periodically between two dimensions, said period coinciding with the circumference of said coil, the greater dimension coinciding with said one side of said coil and the lesser dimension coinciding with said opposed side thereof.

11. The spring guide of claim 5 which is provided with a plurality of curvable portions.

12. The spring guide of claim 5 which is provided with a plurality of said curvable portions so arranged that the wedge-shaped spaces between the helices of one curvable portion are angularly offset about the longitudinal axis of said spring guide with respect to those of another curvable portion thereof.

13. The spring guide of claim 5 in which the wedge-shaped spaces between the helices of a said curvable portion are progressively angularly offset about the longitudinal axis of said spring guide along substantially the full length of said curvable portion whereby to cause said curvable portion to assume a generally corkscrew configuration when tension is applied to said core wire.

14. A catheter unit comprising a catheter having an axial bore and a distendable wall portion and the spring guide of claim 3 positioned within the bore thereof.

15. The catheter unit of claim 14 in which the curvable portion of said spring guide is operably associated with the distendable wall portion of said catheter.

16. The catheter unit of claim 15 which is provided with a plurality of said spring guides within the bore of said catheter.

17. The catheter unit of claim 16 in which the distendable wall portion of said catheter consists of a distendable sleeve fitted thereover and secured thereto at its ends and in which the wall of said catheter underlying said sleeve is provided with a plurality of longitudinal slots respectively radially aligned with the curvable portions of said spring guide which are projectable therethrough.

References Cited

UNITED STATES PATENTS 2,118,631  5/1938  Wappler _____ 128—349

DALTON L. TRULUCK, *Primary Examiner.*

U.S. Cl. X.R.

128—303, 356